United States Patent

[11] 3,594,994

| [72] | Inventor | Anthony R. Engler<br>Houston, Tex. |
|---|---|---|
| [21] | Appl. No. | 818,718 |
| [22] | Filed | Apr. 23, 1969 |
| [45] | Patented | July 27, 1971 |
| [73] | Assignee | Engler Manufacturing Corporation<br>Houston, Tex. |

[54] SEGMENTED FLAIL MOWER
4 Claims, 3 Drawing Figs.

[52] U.S. Cl. .................................................. 56/7
[51] Int. Cl. .......................................... A01d 75/30
[50] Field of Search ................................... 56/6, 7

[56] References Cited
UNITED STATES PATENTS

| 2,672,000 | 3/1954 | Speiser .......................... | 56/7 |
| 2,764,864 | 10/1956 | Kinkead .......................... | 56/7 |
| 3,177,638 | 4/1965 | Johnson .......................... | 56/7 |
| 3,429,109 | 2/1969 | Heth et al. ....................... | 56/7 |

Primary Examiner—Robert Peshock
Attorneys—Murray Robinson and Ned L. Conley

ABSTRACT: A mower, cutter or thresher device, including plural, flail-carrying drums, aligned so as to cut a uniform swath transverse of the direction of motion; means for operatively drawing the device behind a tractor and means for elevating the side wings of the device.

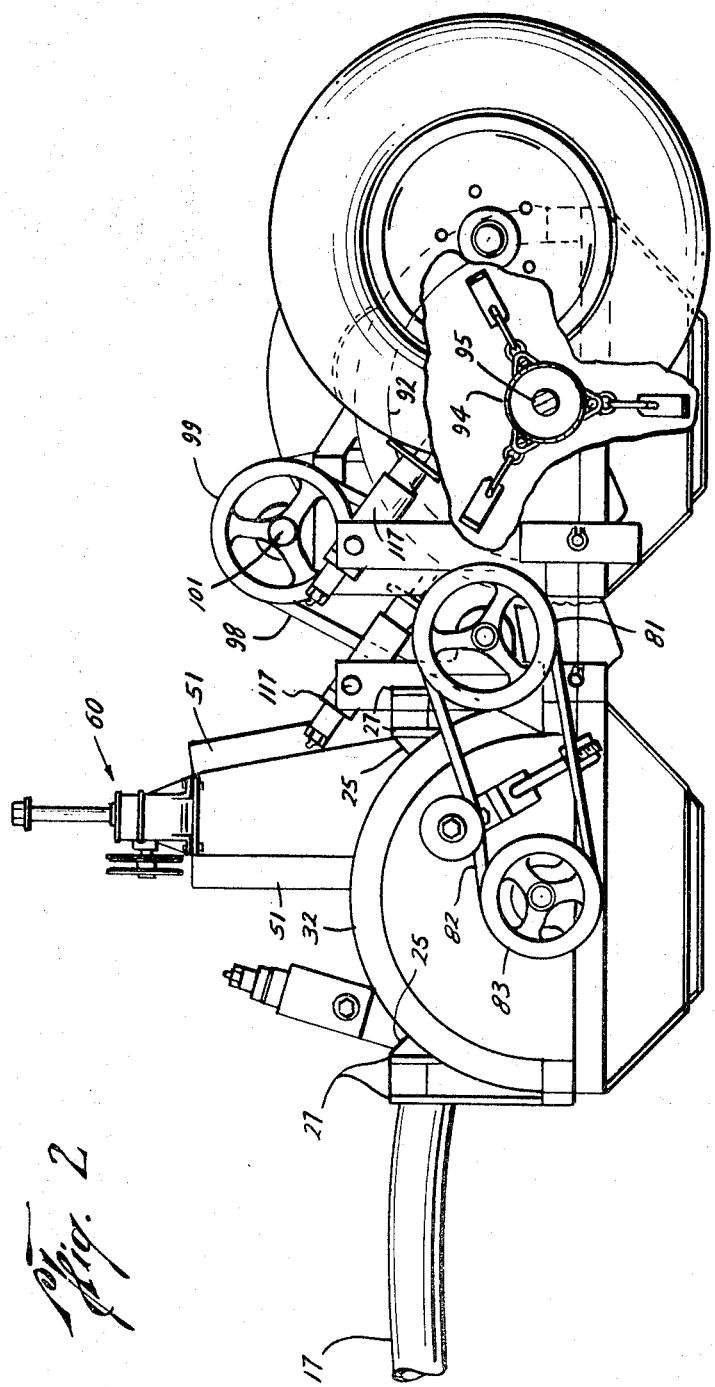
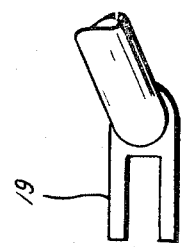
Fig. 2
Anthony R. Engler
INVENTOR.
BY
ATTORNEY

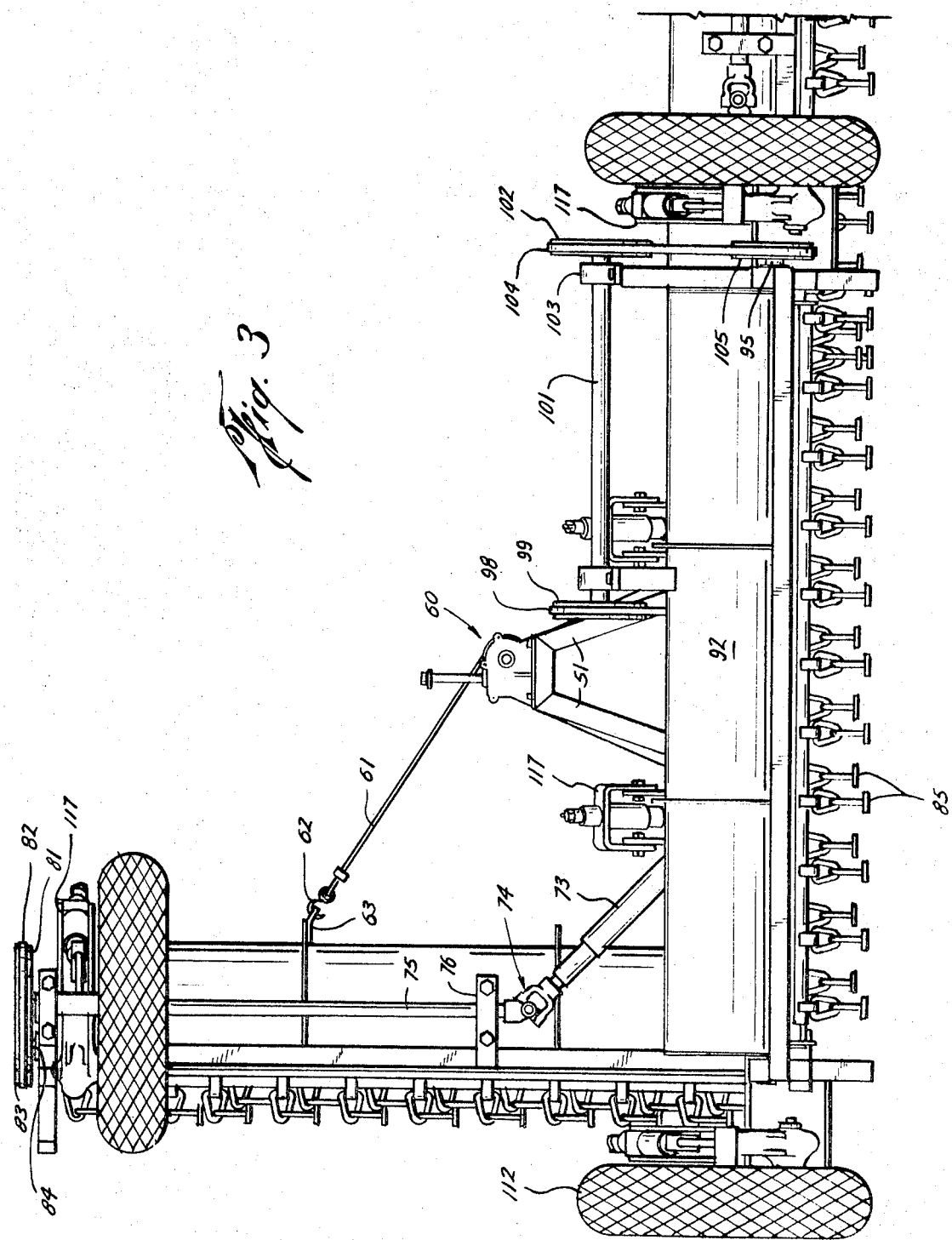

SEGMENTED FLAIL MOWER

BACKGROUND OF THE INVENTION

Mowers, shredders, or the like, have been utilized having rotary cutting blades or a plurality of flails attached to rotor mechanism. With regard to the former, gang-type operation has been devised using a number, usually side-by-side, of overlapping cutters. Heretofore, most, if not all flail devices have utilized a single drum. In certain areas of operation, such as along extended highway rights-of-way, flail mowers may be desirable as ll as mowers capable of cutting a swath of 15 feet or so. Such a cutting width, utilizing a single rotor, might well render the rotor too heavy, bulky or unwieldy to be practical. It is to this area, namely of combining the advantages of a flail cutter with those of a rotary machine, that this invention is directed.

BRIEF DESCRIPTION OF THE INVENTION

A central deck has pivotal wings on either side. Each wing houses a flail rotor. Centrally located, to the rear is a further housing for a flail rotor, which rotor's flails overlap the flails of the forward rotors. Means are provided for the mower to be pulled by a tractor, and for the flail rotors to be driven by the tractor power takeoff. Wheel means are provided the mower at the rear, and adjacent the rearmost rotor housing.

BRIEF DESCRIPTION OF THE DRAWINGS

FIG. 2 is an end view thereof,
and
FIG. 3 is a partial rear elevation, with one wing vertically elevated.

DESCRIPTION OF A PREFERRED EMBODIMENT

Figure 1:
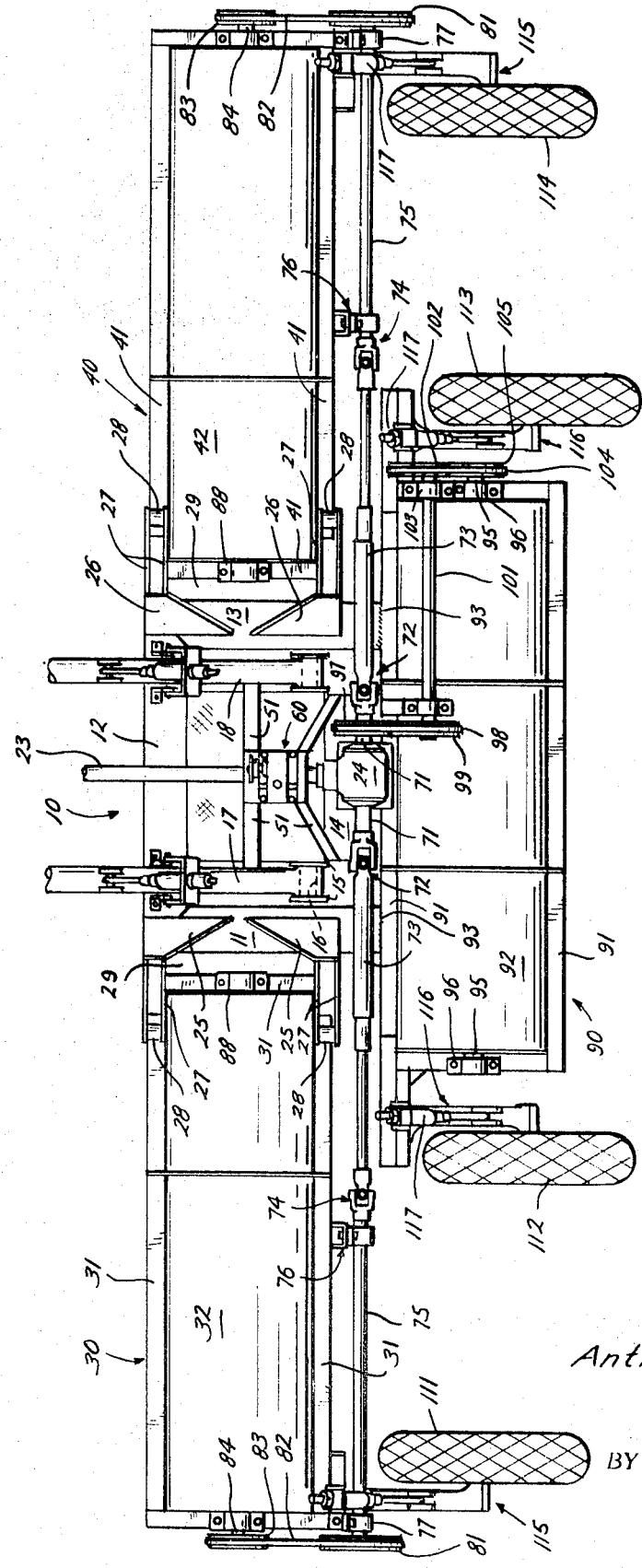
FIG. 1 is a plan view of the fully extended mower.

In the drawings, a centrally forward, flat deck portion 10 has, as its boundaries, channel-iron members 11, 12, 13 and 14. Toward either side of said deck are pivot permitting members comprising upstanding lugs 15, pins 16, which may pass through suitable apertures provided in such lugs as well as through aligned passageways through the rear ends of arms 17, 18 of a drawbar. The forward ends of such arms may bend toward each other to join with hitch or coupling 19 which could be linked to a towing device, such as a tractor (not shown). Forwardly of each of lugs 15, height adjusting mechanisms are provided the deck, which mechanisms may be like those described in U.S. Pat. No, 3,267,651. Thus, the particular cutting height of the mower may be regulated.

Drive shaft 23 would be connected at one end (not shown) to the power takeoff of the source of motive power, for example, a tractor. The other end of shaft 23 would be connected to center gearbox 24 in a conventional manner.

Side wings 30, 40 are provided on either side of center deck portion 10. Each wing would be generally bounded by plates or channel members 31, 41, respectively. Hemicylindrical cowls 32, 42 would connect such plates, and provide a cover or housing for the flail rotors carried by such wings. Means are provided for pivotally elevating each wing with respect to center deck portion 10. Such means include opposed pairs of angularly directed plates 25, 26 affixed to members 11 and 13. Joined to each of such plates are a pair of side arms 27. A pin (not numbered) may pass through bores through the outer end of such arms as well as through apertured lug 28, affixed to plates 31, 41 in the side wings. Note that a space 29 exists intermediate the sides of deck 10 and wings 30, 40. Thus, the wings may pivot about such pins. Means are also provided for physically elevating such wings. A platform is formed centrally of and above deck 10, such platform including legs 51, affixed, as by welding, to the deck. Atop such platform winch means, generally indicated at 60, may have a pulley member to carry cable 61, which cable may include hook 62 attached to appropriate eyes 63 joined to the wings (only the arrangement applicable to wing 30 being shown in FIG. 3). Obviously, such winch means may be manually or power operated.

Means for rotating each wing's flail rotor are seen to extend outwardly from center gearbox 24. Drive shafts 71 are universally coupled at 72 to telescoping intermediate shaft 73, which shaft 73 is further universally coupled at 74 to outboard shaft 75. At one end, shaft 75 is supported by bearing means 76, affixed to the respective wings. Near the other end of shaft 75, it is supported by bearing 77, and bears at its other end pulley 81. This pulley, by virtue of belt 82, may cause rotation of wing rotor pulley 83. This latter pulley is carried by one end of wing rotor shaft 84. The rotor carried by each of shafts 84 and under cowls 32, 42 may be conventionally journaled in bearings at opposite ends of each wing, such as 88. The rotor itself may be conventional, in that a cylindrical member may be affixed to shafts 84, such cylindrical member carrying a plurality of individuals flails such as 85.

Central flail rotor housing 90 is positioned rearwardly of center deck 10. The housing includes plates or channel frames 91 connected by hemicylindrical cowl 92. Forwardly frame members 91 are rigidly attached, as at 93, to center deck 10. The flail rotor 94, under cowl 92, is carried by shaft 95, which shaft is supported at its ends, by bearings 96 fixed to the framework, or super structure, of housing 90. Means for rotating shaft 95 lead from one of shafts 71 (right side of FIG. 1), which drive shaft carries pulley 97. Belt 98 connects said pulley 97 with intermediate pulley 99. Shaft 101 connects pulley 99 with further pulley 102, bearing member 103 supporting shaft 101 adjacent its linkage with pulley 102. Belt 104 rotates central flail rotor shaft pulley 105, by virtue of its encircling relation to said pulleys 105 and 102. The shaft 95 is joined to said pulley 105 for rotation therewith. Thus, all three flail rotors are operatively driven off center gearbox 24.

Supporting means for the entire mower are provided by wheels 111, 112, 113 and 114. Combined supporting frames and axles 115 are fixed to and extend rearwardly from the outboard ends of wings 30, 40 to support wheels 111, and 114. Like supporting frames and axles 116 extend rearwardly from transverse extensions of center housing 90, to support wheels 112, and 113. Combined height adjustment and shock absorber mechanisms 117 may be provided members 115 and 116. Such mechanisms are adequately described in U.S. Pat. No. 3,435,599.

It will be noticed that the placement of central flail housing and its flail rotor to the rear of center deck 10 and wings 30, 40, not only allows the three flail carrying rotors to overlap and cut a continuous transverse swath, but also this placement permits the most compact arrangement of parts. For example, all wheels may be rearward of the operative cutting areas, and, along with the three rotor housings and center deck, be confined within a substantially rectangular area. Were the center housing 90 forwardly of center deck 10, a larger area, perpendicular to the rotor axis, would be utilized, inasmuch as the wheels would still need be placed at the side or rear of the main portion, i.e., wings and center deck. Further, it will be seen from FIG. 3 that on elevating one wing (or both, if mechanism 60 included plural winch members as would be possible) that side is supported by wheel 112, further reducing the area required for operation. These features, namely conservation of area, permit the greatest area of operative cutting or shredding within the limited confines of the terrain. These features may be quite important in areas of restricted movement, such as when traversing alongside highways, passing through gates, or operating on rough or difficult terrain.

Although only a single embodiment has been described, it should be obvious that numerous modifications are possible by one skilled in the art without departing from the spirit of the invention, the scope of which is intended to be limited only by the following, in which I claim:

1. A flail cutting device including:
    a deck adapted to be moved generally horizontally overland,
    draw means connected to said deck adapted for making connection to means for towing said deck forwardly,
    a central housing connected to the rear of said deck, first support means for supporting said central housing comprising first and second wheels spaced apart laterally with respect to the line of tow, each of said first and second wheels being mounted on said central housing for rotation about a laterally extending horizontal axis, a central flail rotor means disposed between said first and second wheels and mounted on said central housing for rotation about a laterally extending horizontal axis, a pair of side housings, means pivotally connecting one end of each of said side housings to one side of said deck for pivoting about a horizontal fore and aft extending axis of rotation, the other end of each of said side housings being free to move up and down, side flail rotor means carried by each of said housings and mounted thereon for rotation about a laterally extending horizontal axis, the ends of said side flail rotor means adjacent the free ends of said side housings constituting the outer ends of said side flail rotor means and the ends of said side flail rotor means adjacent the pivotally connected ends of said side flail housings constituting the inner ends of said side flail rotor means, the lateral extent of said central flail rotor means being less than the distance between the outer ends of said side flail rotor means but greater than the distance between the inner ends of said side flail rotor means, second support means for supporting said side housings comprising third and fourth wheels spaced apart laterally with respect to the line of tow, said third and fourth wheels being mounted, respectively, one on one of said side housings and the other on the other of said side housings, for rotation about a horizontal laterally extending axis, said third and fourth wheels being disposed behind said side housings adjacent but not laterally beyond the free ends thereof, said first and second wheels being disposed between said third and fourth wheels, said third wheel being disposed alongside of said first wheel and said fourth wheel being disposed alongside of said second wheel, the axes of rotation of said first and second wheels being no further rearward than the vertical plane at the rear of said central housing, whereby said central housing, said first and second wheels, and said third and fourth wheels occupy a generally rectangular area immediately to the rear of the generally rectangular area occupied by said deck and said side housings, providing a compact device in which none of the wheels is in front of any of the flail rotor means, and rotation causing means carried by said device for transmitting rotation to said flail rotor means.

2. The device of claim 1 wherein said rotation causing means includes a drive shaft connectable to a power takeoff from a source of motive power and extending over said deck in a fore and aft direction, a gearbox connected to the rear end of said drive shaft, shaft means extending laterally from said gearbox to the free end of each of said side housings, each of said shaft means including a telescopic joint interposed between two universal joints, bearing means carried by each of said side housings supporting said shaft means outwardly from said telescopic and universal joint portions thereof, and belt and pulley means at the outer end of each of said shaft means connecting the latter with the outer end of the side flail rotor means carried by the side housing.

3. The device of claim 2 wherein said rotation causing means further includes a counter shaft carried by said central housing, belt and pulley means connecting one end of said counter shaft to one of said shaft means, and belt and pulley means connecting the other end of said counter shaft to one of said central flail rotor means.

4. The device according to claim 3 including a platform rising from said deck above said drive shaft and winch means mounted on said platform for raising and lowering said side housings.